(12) United States Patent
Stagg et al.

(10) Patent No.: US 9,697,393 B2
(45) Date of Patent: Jul. 4, 2017

(54) METHODS AND SYSTEMS FOR ADJUSTING MOBILE-DEVICE OPERATING PARAMETERS BASED ON HOUSING-SUPPORT TYPE

(71) Applicant: SYMBOL TECHNOLOGIES, LLC, Lincolnshire, IL (US)

(72) Inventors: Adrian J. Stagg, Belfountain (CA); Richard M. Martin, New Hyde Park, NY (US); Jaeho Choi, Whitestone, NY (US); Ian R. Jenkins, Stony Brook, NY (US); Chandra M. Nair, Mount Sinai, NY (US); Konstantinos D. Tsiopanos, Selden, NY (US)

(73) Assignee: Symbol Technologies, LLC, Holtsville, NY (US)

( * ) Notice: Subject to any disclaimer, the term of this patent is extended or adjusted under 35 U.S.C. 154(b) by 0 days.

(21) Appl. No.: 14/947,556

(22) Filed: Nov. 20, 2015

(65) Prior Publication Data

US 2017/0147841 A1 May 25, 2017

(51) Int. Cl.
*G06K 7/08* (2006.01)
*G06K 7/10* (2006.01)

(52) U.S. Cl.
CPC ..... *G06K 7/10237* (2013.01); *G06K 7/10405* (2013.01)

(58) Field of Classification Search
CPC .......... G06K 7/10891; G06K 7/10881; G06K 7/10851; G06K 7/10693; G06K 17/00; G06K 7/14; G06K 7/10772; G06K 7/084; G06K 7/087

USPC .............. 235/449, 380, 462.13, 454, 462.44, 235/462.45
See application file for complete search history.

(56) References Cited

U.S. PATENT DOCUMENTS

| | | | |
|---|---|---|---|
| 4,097,133 A | 6/1978 | Stemme et al. | |
| 4,282,425 A | 8/1981 | Chadima, Jr. et al. | |
| 5,035,181 A | 7/1991 | Jacks et al. | |

(Continued)

FOREIGN PATENT DOCUMENTS

| | | |
|---|---|---|
| EP | 1225501 A2 | 7/2002 |
| GB | 2299394 A | 10/1996 |

(Continued)

OTHER PUBLICATIONS

Office action for U.S. Appl. No. 13/685,750 mailed on Aug. 22, 2013.

(Continued)

*Primary Examiner* — Karl D Frech

(57) ABSTRACT

Disclosed herein are methods and systems for adjusting mobile-device operating parameters based on housing-support type. In an embodiment, a mobile device includes a housing; a data-acquisition device disposed in the housing; a sensor module configured to detect at least one housing-support element in a housing support, and to communicate a mode-identification signal indicative of the detection; and a processor coupled to the sensor module, configured to receive the mode-identification signal, to determine (a) whether the housing is positioned in a housing support and (b) a housing-support type, and to adjust one or more operating parameters of the mobile device based at least in part on the determined housing-support type.

23 Claims, 7 Drawing Sheets

(56) References Cited

U.S. PATENT DOCUMENTS

| | | |
|---|---|---|
| 5,204,531 A | 4/1993 | Elings et al. |
| 5,250,790 A | 10/1993 | Melitsky et al. |
| 5,340,972 A | 8/1994 | Sandor |
| 5,349,497 A | 9/1994 | Hanson et al. |
| 5,382,784 A | 1/1995 | Eberhardt |
| 5,477,044 A | 12/1995 | Aragon |
| 5,496,992 A | 3/1996 | Madan et al. |
| 5,736,726 A | 4/1998 | VanHorn et al. |
| 5,770,848 A | 6/1998 | Oizumi et al. |
| 5,801,918 A | 9/1998 | Ahearn et al. |
| 5,828,052 A | 10/1998 | Reynolds et al. |
| 5,837,990 A | 11/1998 | Shepard |
| 5,905,248 A | 5/1999 | Russell et al. |
| 5,970,184 A | 10/1999 | Katoh et al. |
| 6,056,199 A | 5/2000 | Wiklof et al. |
| 6,085,981 A | 7/2000 | Knowles et al. |
| 6,115,025 A | 9/2000 | Buxton et al. |
| 6,184,654 B1 | 2/2001 | Bachner, III et al. |
| 6,223,987 B1 | 5/2001 | Knowles et al. |
| 6,234,395 B1 | 5/2001 | Chadima, Jr. et al. |
| 6,286,760 B1 | 9/2001 | Schmidt et al. |
| 6,394,355 B1 | 5/2002 | Schlieffers et al. |
| 6,412,699 B1 | 7/2002 | Russell et al. |
| 6,421,234 B1 | 7/2002 | Ricks et al. |
| 6,502,754 B1 | 1/2003 | Bhatia et al. |
| 6,518,952 B1 | 2/2003 | Leiper |
| 6,575,369 B1 | 6/2003 | Knowles et al. |
| 6,607,134 B1 | 8/2003 | Bard et al. |
| 6,648,229 B1 | 11/2003 | Knowles et al. |
| 6,691,919 B1 | 2/2004 | Katz et al. |
| 6,726,070 B2 | 4/2004 | Lautner |
| 6,754,069 B2 | 6/2004 | Harada |
| 6,844,869 B1 | 1/2005 | Kukita |
| 6,853,293 B2 | 2/2005 | Swartz et al. |
| 7,065,299 B2 | 6/2006 | Schluter et al. |
| 7,077,328 B2 | 7/2006 | Krishnaswamy et al. |
| 7,147,162 B2 | 12/2006 | Fitch et al. |
| 7,157,705 B2 | 1/2007 | Hamrelius et al. |
| 7,191,947 B2 | 3/2007 | Kahn et al. |
| D540,838 S | 4/2007 | Aronsson et al. |
| 7,250,603 B1 | 7/2007 | Nugent |
| 7,389,933 B2 | 6/2008 | Wang |
| D583,263 S | 12/2008 | Sebban |
| 7,490,776 B2 | 2/2009 | Thuries |
| 7,562,824 B2 | 7/2009 | Bhatia et al. |
| 7,566,009 B2 | 7/2009 | Lapstun et al. |
| 7,609,406 B2 | 10/2009 | Roth et al. |
| 7,746,511 B2 | 6/2010 | Hamilton et al. |
| 7,748,632 B2 | 7/2010 | Coleman et al. |
| 7,764,488 B2 | 7/2010 | Calvarese |
| 7,867,019 B1 | 1/2011 | Loukusa et al. |
| 7,886,377 B2 | 2/2011 | Hamberg et al. |
| D658,222 S | 4/2012 | Elrod et al. |
| D665,440 S | 8/2012 | Sigward |
| 8,245,930 B2 | 8/2012 | Bellows et al. |
| 8,255,836 B1 | 8/2012 | Gildfind |
| D668,561 S | 10/2012 | Dunkin et al. |
| 8,314,817 B2 | 11/2012 | Williamson et al. |
| 8,477,044 B2 | 7/2013 | Wagner et al. |
| 8,825,516 B2 | 9/2014 | Grant et al. |
| 9,113,235 B2 | 8/2015 | Choi et al. |
| 9,129,174 B2 | 9/2015 | Choi et al. |
| 9,202,095 B2 | 12/2015 | Martin et al. |
| 9,314,472 B2 | 4/2016 | Beus et al. |
| 2002/0099894 A1 | 7/2002 | Kehoe et al. |
| 2002/0104887 A1 | 8/2002 | Schlieffers et al. |
| 2002/0140668 A1 | 10/2002 | Crawford |
| 2002/0165436 A1 | 11/2002 | Schluter et al. |
| 2003/0179178 A1 | 9/2003 | Zargham |
| 2004/0129903 A1 | 7/2004 | Diamantstein et al. |
| 2005/0001036 A1 | 1/2005 | Blake et al. |
| 2005/0117624 A1 | 6/2005 | Hollander et al. |
| 2006/0105722 A1 | 5/2006 | Kumar |
| 2006/0138232 A1 | 6/2006 | Hammerslag et al. |
| 2006/0197753 A1 | 9/2006 | Hotelling |
| 2006/0221363 A1 | 10/2006 | Roth et al. |
| 2006/0229034 A1 | 10/2006 | Gizis et al. |
| 2007/0063048 A1 | 3/2007 | Havens et al. |
| 2007/0067745 A1 | 3/2007 | Choi et al. |
| 2007/0131774 A1 | 6/2007 | Celestini |
| 2008/0078839 A1 | 4/2008 | Barkan |
| 2008/0105747 A1 | 5/2008 | Orlassino |
| 2008/0116093 A1 | 5/2008 | Felten et al. |
| 2008/0116271 A1 | 5/2008 | Holz et al. |
| 2008/0128492 A1 | 6/2008 | Roth et al. |
| 2008/0128499 A1 | 6/2008 | Chen et al. |
| 2008/0128512 A1 | 6/2008 | Schmidt et al. |
| 2008/0144696 A1 | 6/2008 | Bruggeman et al. |
| 2008/0163504 A1 | 7/2008 | Smith et al. |
| 2009/0033633 A1 | 2/2009 | Newman et al. |
| 2009/0039162 A1 | 2/2009 | Yen |
| 2009/0102925 A1 | 4/2009 | Sheard et al. |
| 2009/0108076 A1 | 4/2009 | Barkan et al. |
| 2009/0116018 A1 | 5/2009 | Austin et al. |
| 2009/0172591 A1 | 7/2009 | Pomper |
| 2009/0224039 A1 | 9/2009 | Hause et al. |
| 2009/0257469 A1 | 10/2009 | Jones et al. |
| 2009/0266899 A1 | 10/2009 | Yoshizawa |
| 2009/0289116 A1 | 11/2009 | Copeland et al. |
| 2009/0307634 A1 | 12/2009 | Strandell |
| 2010/0026498 A1 | 2/2010 | Bellows et al. |
| 2010/0037184 A1 | 2/2010 | Sie |
| 2010/0046577 A1 | 2/2010 | Sheard et al. |
| 2010/0096461 A1 | 4/2010 | Kotlarsky et al. |
| 2010/0148066 A1 | 6/2010 | Stratmann et al. |
| 2010/0171021 A1 | 7/2010 | Smith |
| 2010/0228517 A1 | 9/2010 | Wike, Jr. et al. |
| 2010/0277506 A1 | 11/2010 | Yao |
| 2011/0075339 A1 | 3/2011 | Lam |
| 2011/0121075 A1 | 5/2011 | Bellows et al. |
| 2011/0164056 A1 | 7/2011 | Ording et al. |
| 2011/0180600 A1 | 7/2011 | Wang et al. |
| 2011/0246336 A1 | 10/2011 | Callaghan et al. |
| 2011/0249104 A1 | 10/2011 | Cardillo et al. |
| 2011/0266348 A1 | 11/2011 | Denniston, Jr. |
| 2011/0290886 A1 | 12/2011 | Carlson |
| 2011/0290889 A1 | 12/2011 | Tamburrini et al. |
| 2012/0006896 A1 | 1/2012 | Henry et al. |
| 2012/0148115 A1 | 6/2012 | Birdwell et al. |
| 2012/0314083 A1 | 12/2012 | Ratliff et al. |
| 2013/0299574 A1* | 11/2013 | Theobald ............ G06Q 20/34 235/380 |
| 2014/0014725 A1 | 1/2014 | Martin et al. |
| 2014/0014726 A1 | 1/2014 | Tsiopanos et al. |
| 2014/0014727 A1 | 1/2014 | Choi et al. |
| 2014/0014728 A1 | 1/2014 | Choi et al. |
| 2014/0145925 A1 | 5/2014 | Martin et al. |
| 2014/0145953 A1 | 5/2014 | Tsiopanos et al. |

FOREIGN PATENT DOCUMENTS

| | | |
|---|---|---|
| GB | 2358336 A | 7/2001 |
| GB | 2396728 A | 6/2004 |
| JP | 11328121 A | 11/1999 |
| JP | 2002-117370 A | 4/2002 |
| JP | 2004-135324 A | 4/2004 |
| JP | 2009-282761 A | 3/2009 |
| WO | 9314472 A1 | 7/1993 |
| WO | 0127735 A1 | 4/2001 |
| WO | 2004017613 A1 | 2/2004 |
| WO | 2004066615 A1 | 8/2004 |
| WO | 2007061498 A2 | 5/2007 |

OTHER PUBLICATIONS

Office action for U.S. Appl. No. 13/685,750 mailed on Jan. 16, 2014.

Decision on Appeal for U.S. Appl. No. 13/685,750 mailed on Aug. 18, 2016.

Response to office action for U.S. Appl. No. 13/685,750 filed with the USPTO on Oct. 7, 2016.

Office action issued by the USPTO for U.S. Appl. No. 13/685,750 mailed on Oct. 26, 2016.

(56) References Cited

OTHER PUBLICATIONS

Office action for German Patent Application No. 112013003511.1 mailed on Aug. 10, 2016.
Leenes R, et al, "Prime white paper," EU Project Prime, Privacy and Identity Management for Europe, Third and Final Version, May 15, 2008, 22 pages.
Stanescu, "Fujitsu F-01A is a Waterproof Phone, Packs a Fingerprint Scanner" Jan. 21, 2009. http://www.gsmdome.com/fujitsu-f-01a-is-a-waterproof-phone-packs-a-fingerprint-scanner.
The Motorola MC9500-K Specification Sheet, Copyright Aug. 2009.
The Motorola MC9500-K Specification Sheet, Copyright Aug. 2010.
Joshua Topolsky, "Motorola Atrix 4G Review" Feb. 14, 2011. http://www.engadget.com/motorola/atrix-4g-review/#/.
Christian Holz, Patrick Baudish, "Fiberio: A Touchscreen that Senses Fingerprints" UIST 2013. http://www.christianholz.net/fiberio.html.
Ohiya Kuriakose, "The First Touchscreen to Recognize Fingerprints" Jul. 23, 2013. http://mashable.com/2013/07/23/tabletop-touchscreen/#9A1rW2X2T5qg.
International Search Report and Written Opinion for International Patent Application No. PCT/US2013/049945 mailed on Oct. 10, 2013.
International Search Report and Written Opinion for International Patent Application No. PCT/US2013/049950 mailed on Oct. 17, 2013.

\* cited by examiner

METHODS AND SYSTEMS FOR ADJUSTING MOBILE-DEVICE OPERATING PARAMETERS BASED ON HOUSING-SUPPORT TYPE

BACKGROUND OF THE INVENTION

Hands-free presentation scanning is conventionally achieved using a scanning device that includes a data-acquisition device. The scanning device may be mounted to a surface, such as a table or a shelf. The scanning device is usually activated in an always-on mode of operation. An object having a barcode symbol is moved through a field-of-view of the data-acquisition device and data is acquired when the data-acquisition device recognizes and reads the barcode symbol.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
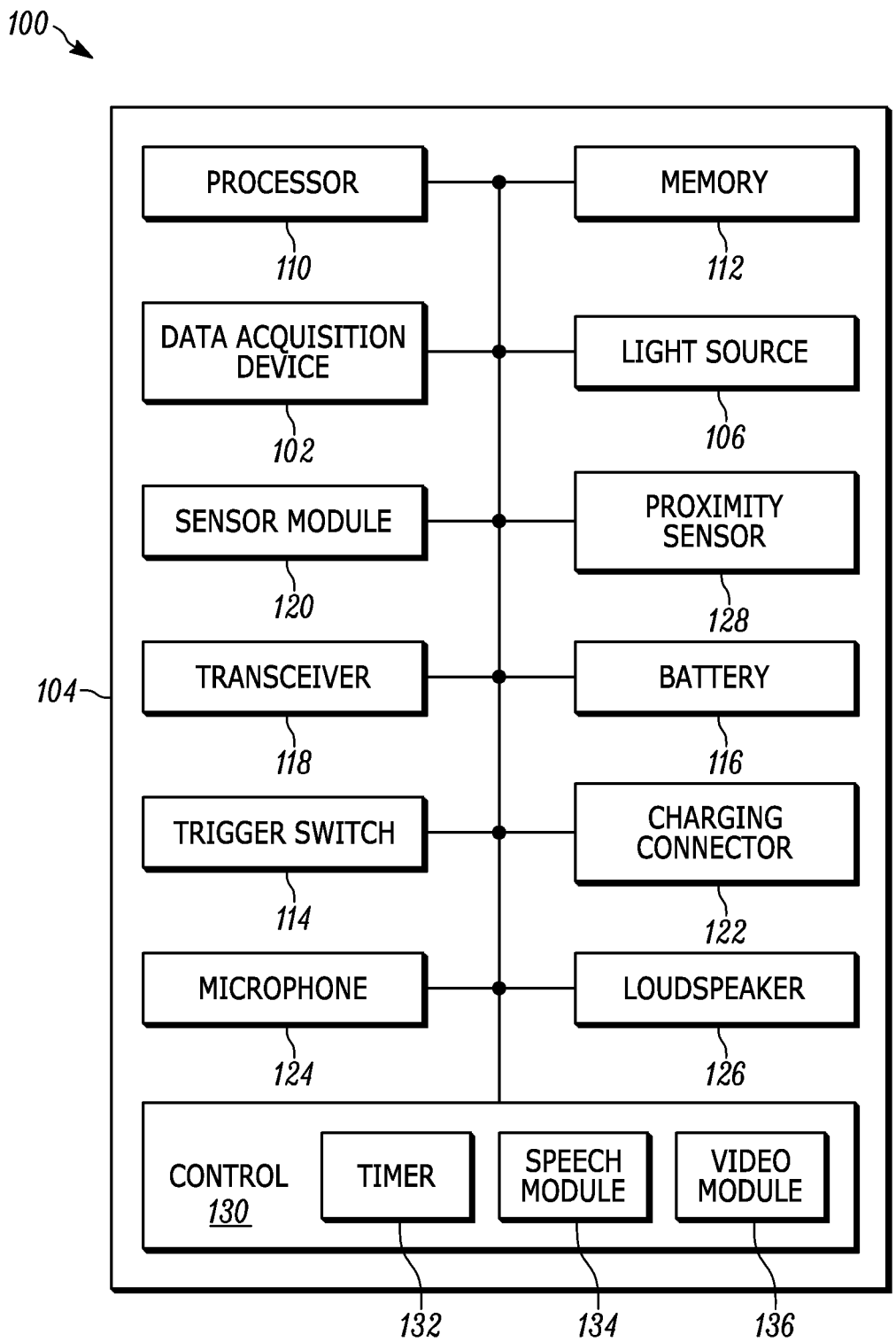
FIG. 1 is a block diagram of a mobile device in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

Methods and systems are described herein for a mobile device that includes a housing, a data-acquisition device disposed in the housing, a sensor module configured to detect at least one housing-support element in a housing support, and to communicate a mode-identification signal indicative of the detection, and a processor coupled to the sensor module, configured to receive the mode-identification signal, to determine (a) whether the housing is positioned in a housing support, and (b) a housing-support type, and to adjust one or more operating parameters of the mobile device at least in part in response to receiving the mode-identification signal from the sensor module.

The following detailed description is merely illustrative in nature and is not intended to be limiting. Furthermore, there is no intention to be bound by any express or implied theory presented in the preceding technical field, background, brief summary or the following detailed description. For the purposes of conciseness, many conventional techniques and principles related to acquiring data from an object need not, and are not, described in detail herein.

Techniques and technologies may be described herein in terms of functional and/or logical block components and various processing steps. It should be appreciated that such block components may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

The following description may refer to elements or nodes or features being "connected" or "coupled" together. As used herein, unless expressly stated otherwise, "connected" means that one element/node/feature is directly joined to (or directly communicates with) another element/node/feature, and not necessarily mechanically. Likewise, unless expressly stated otherwise, "coupled" means that one element/node/feature is directly or indirectly joined to (or directly or indirectly communicates with) another element/node/feature, and not necessarily mechanically. The term "exemplary" is used in the sense of "example, instance, or illustration" rather than "model," or "deserving imitation."

Technologies and concepts discussed herein relate to presentation scanning for hands-free operation of mobile devices.

FIG. 1 is a block diagram depicting components of a mobile device 100 in accordance with some embodiments. The mobile device 100 includes a data-acquisition device 102 supported by (including disposed in or on) a housing 104. The data-acquisition device 102 can include an imaging device, such as a camera, as well as a scanning device, including a laser scanner, a radio-frequency identification (RFID) device, or a combination of data acquisition devices. In practice, any suitable data-acquisition device 102 can be used. In one embodiment, an optional light source 106 can be supported by the housing 104. The light source 106 can illuminate a target for data acquisition by the imaging device, for example.

Figure 2:
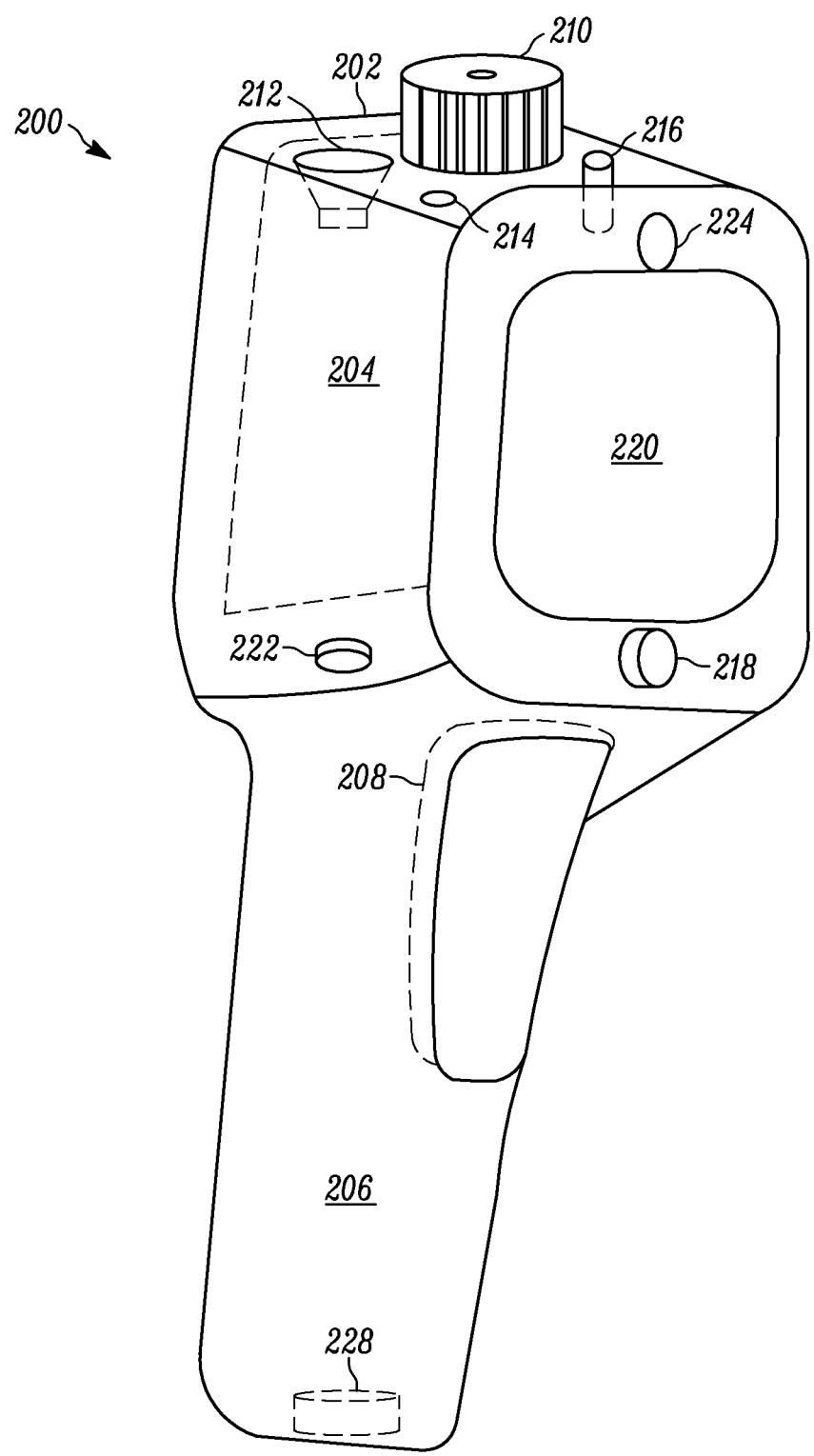
FIG. 2 depicts a mobile device, in accordance with some embodiments.

When the data-acquisition device 102 includes an imager, the imager can be any component configured to capture image data. For example, the imager can include any type of image sensor or sensors. The imager can capture an image in a field of view (FoV) of the imager. In one embodiment, the image captured in the FoV of the imager can be displayed on a display 204 (FIG. 2).

The mobile device 100 can also include a processor 110, a memory 112, a trigger switch 114, a battery 116, a transceiver 118, a sensor module 120, a charging connector 122, a microphone 124, a loudspeaker 126, a proximity sensor 128 and other optional components (not shown), such as a volume control, and/or control switches, for example.

The display 204 (FIG. 2) can be any component configured to display data to a user. The display can include, for example, a liquid crystal display (LCD) at least partially disposed in the housing 104 of the mobile device 100. The display 204 can include touch screen capability. The display 204 can display a graphical user interface (GUI). The GUI can be programmed to activate different functions of the mobile device 100. For example, the processor 110 can generate the GUI on the display 204 to provide icons corresponding to certain functionality of the mobile device 100, and adjust one or more operating parameters of mobile device 100 according to user input.

The trigger switch 114 can also accept user input to activate different functions of the mobile device 100. For example, the trigger switch 114 can activate the data-acquisition device 102 of the mobile device 100 in a handheld mode of operation.

The processor 110 can provide conventional functionalities for the mobile device 100. In an embodiment and as will be described in further detail below, the mobile device 100 can include a plurality of software applications that are executed on the processor 110 such as a software application related to capturing and processing images, documents and video. The memory 112 can also provide conventional functionalities for the mobile device 100. For example, the memory 112 can store data and software applications related to operations performed by the processor 110. In some embodiments, the processor 110 is configured to receive a mode-identification signal from sensor module 120 and to responsively determine (a) that mobile device 100 is positioned in a housing support 400 (FIG. 4) and (b) the type of housing support. In some embodiments, the processor 110 is configured to adjust one or more operating parameters based at least in part on the determined housing-support type. In some embodiments, processor 110 is configured to set a detection range of the proximity sensor 128. In some embodiments, the one or more operating parameters comprises at least one operating parameter selected from the group consisting of: enabling or disabling a touch screen and/or display, presenting a driving-mode user interface (UI), enabling or disabling voice commands, adjusting display brightness, adjusting loudspeaker 126 volume, and adjusting a field of view for the data-acquisition device 102 and/or proximity sensor 128. In some embodiments, at least one operating parameter is preconfigured by a user for a given housing-support type with the user having the ability to reconfigure the operating parameters for various housing support types. In some embodiments, the user may dynamically adjust one or more operating parameters during operation (i.e. after the operating parameters have been automatically adjusted in response to being placed in a housing support). In some embodiments, some operating parameters may be fixed for certain housing-support types. An example of a fixed operating parameter may be disabling touchscreen functionality on the display and/or display output if the housing-support type is a forklift housing support as a safety precaution. Therefore, in some embodiments, users may not preconfigure or dynamically adjust such fixed operating parameters for one or more of the housing support types. Various embodiments of operating parameter configurations will be given for various housing type supports below.

The microphone 124 can be coupled to the processor 110 and used as an input device to control functions of the mobile device 100. For example, the processor 110 can perform speech recognition on data received from the microphone 124. In some embodiments, the user commands the mobile device 100 to activate the data-acquisition device 102 by speaking into the microphone 124. In some embodiments, one or more operating parameters may be dynamically adjusted via voice commands spoken into the microphone. The loudspeaker 126 can provide audio signals to a user. For example, the loudspeaker 126 can emit an audio signal indicating that data was successfully acquired. In some embodiments, the mobile device 100 includes an audio jack (not shown) that couples to an audio connector of a headset. The audio signal can be transmitted to the headset through the audio jack.

A transceiver 118 can provide the mobile device 100 with a method of exchanging data with a communications network and/or other mobile devices. For example, the transceiver 118 can be a Bluetooth transceiver that wirelessly transmits audio signals to a Bluetooth-enabled headset.

Figure 4:
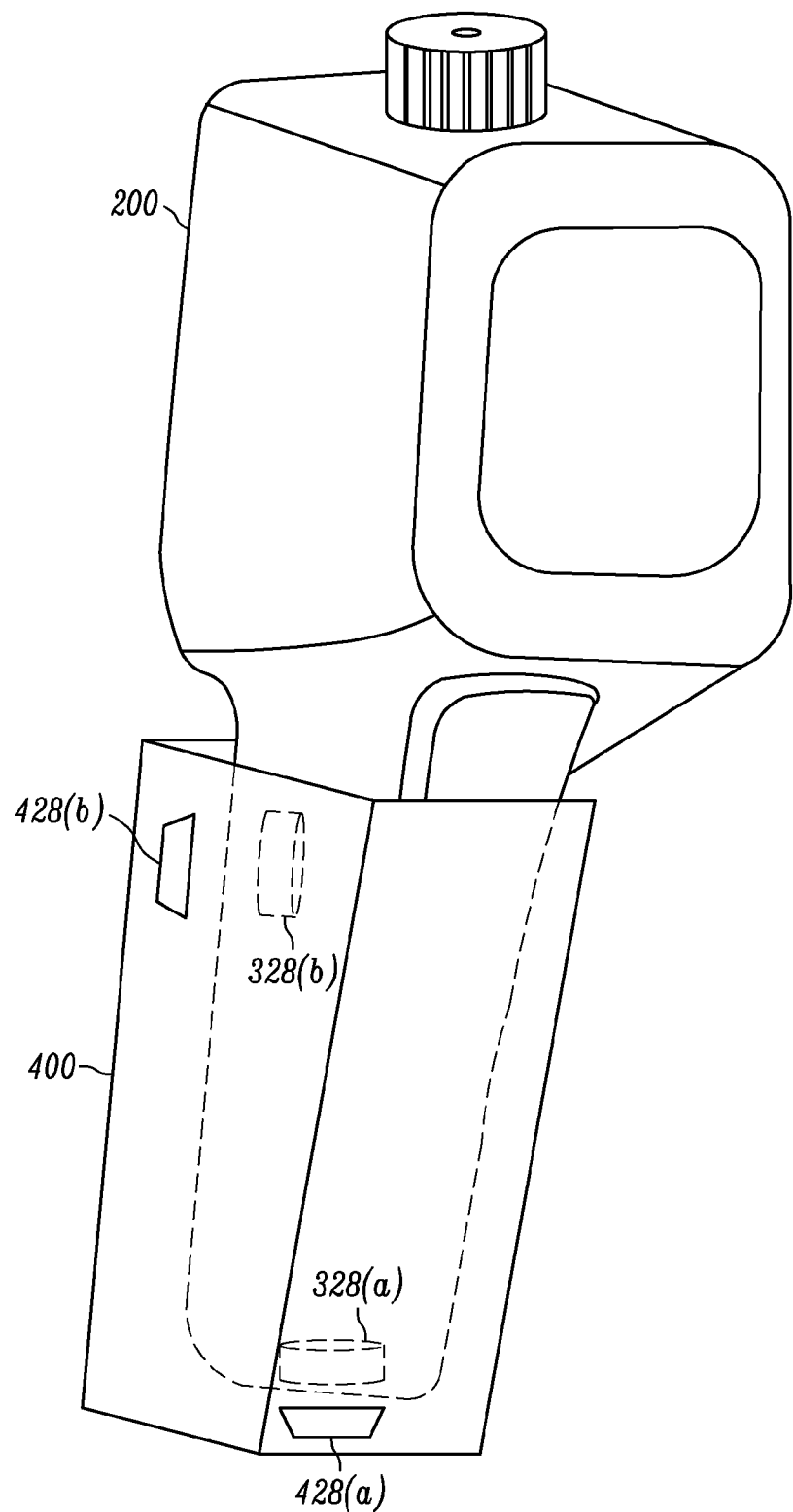
FIG. 4 depicts a mobile device placed in a housing support, in accordance with some embodiments.

The sensor module 120 can be configured to detect information about the mobile device 100 surroundings. In some embodiments, the sensor module is configured to detect a housing-support element in a housing support. In some embodiments, the sensor module 120 includes a magneto-resistive sensor or a Hall effect sensor configured to detect a magnet in the housing support. In some embodiments, the sensor module 120 may include an optical sensor configured to detect that the housing support is in close proximity to the housing. In some embodiments, the sensor module 120 includes a radio-frequency identification (RFID) scanner configured to detect an RFID tag in the housing support. Based on the data received from the RFID scanner, the processor 110 may be configured to determine the type of the housing support. In some embodiments, sensor module 120 may include a scanner configured to scan a barcode on the housing support. In some embodiments, sensor module 120 may include a camera or imager configured to identify a visual marker on the housing support. In some embodiments, the visual marker may be a quick-response (QR) code, a barcode, or an image known by the processor. In some embodiments, the data acquisition device 102 may be configured to provide a mode-identification signal to the processor 110. In such embodiments, a user may utilize components in the data acquisition device (e.g., laser scanner, an RFID scanner) to scan a barcode or other visual marker on a housing support prior to placing the mobile device in the housing support, initiating the processor to configure the operating parameters. In other embodiments, an additional RFID or laser scanner may be disposed on the housing as part of the sensor module in order to detect or scan housing-support elements 428(a) and/or 428(b) (FIG. 4) that are disposed in known locations on the housing support 400 (FIG. 4). In such embodiments, the housing support type may be automatically detected subsequent to placing the mobile device in the housing support. In additional embodiments, either the data acquisition device 102 or the sensor module 120 utilizes a Near Field Communication (NFC) reader to detect an NFC tag in a housing support, determine that the mobile device 100 is disposed in the housing support, and identify the housing support type based on a housing support identifying information received from the NFC tag.

In some embodiments, sensor module 120 may include a microphone configured to detect a sound associated with a housing support when placed into the housing support. The sound may be a unique sound (e.g., a latching sound) selected from a library of unique sounds associated with various housing-support types, with the corresponding sound library data being stored in the memory of the mobile device. In some embodiments, a tolerance and/or filtering is placed on the sound detected by the microphone to compensate for noise or some other factor. In some embodiments, the unique sound may be a characteristic latching sound as the mobile device 100 is placed into the housing support.

In some embodiments, sensor module 120 may include a motion sensor configured to detect motion. In some embodiments, processor 110 may be configured to adjust one or more operating parameters in response to the motion sensor detecting motion. In some embodiments, the motion sensor may include at least one of an accelerometer or a gyroscopic device. In some embodiments, the processor may adjust one or more operating parameters based on a combination of information received from a gyroscope and an accelerometer.

The battery 116 can be a rechargeable battery. The charging connector 122 can be a charging connector that is accessible to a corresponding connector on one end of a charging cable or in a charging cradle (not shown). In practice, the charging connector 122 can be a universal serial bus (USB) connector that conveys data as well as electrical current.

The proximity sensor 128 detects when an object is positioned proximate to the mobile device 100. The proximity sensor 128 is a sensor configurable to detect the presence of a nearby object without requiring any physical contact with the object. In some embodiments, the proximity sensor 128 can include an emitter and a detector. For example, the emitter can emit an electromagnetic field or a beam of electromagnetic radiation (such as infrared (IR) radiation). The detector can detect changes in the electromagnetic field or a detected return signal.

The mobile device 100 can include additional components conventionally found in electronic devices, such as a control switches, charging circuitry and one or more antennas, for example.

FIG. 2 illustrates a perspective view of a mobile device 200 in accordance with some embodiments. As shown, mobile device 200 includes a housing 202 supporting a display 204. The display 204 can be a touchscreen display. The housing 202 includes a handle portion 206 in the shape of a pistol grip. The handle portion 206 is configured to be held in a hand of a user. The handle portion 206 can be supported by a housing support 400 (FIG. 4) to enable various modes of hands-free operation, the various modes depending on the housing-support type. In some embodiments, the housing support can be attached or mounted to a user (e.g., to a torso or waist), a desk, a vehicle, a forklift, a cart, as well as various other possible mount types.

A trigger switch 208 is located on the handle portion 206 of the mobile device 200. The trigger switch 208 is positioned on the handle portion 206 such that the trigger switch 208 is accessible to an index finger of a hand of a user when the handle portion 206 is held in the hand of the user in a hand-held mode of operation.

In some embodiments, the trigger switch 208 can be a momentary switch. Alternatively, the trigger switch 208 can be a "toggle" switch for continuous "on" or "off" operation. In one embodiment, the trigger switch 208 actuates at least one function of the mobile device 200. For example, the trigger switch 208 can activate a data capture function of the mobile device 200.

The trigger switch 208 can be a bifurcated switch (not shown) for controlling two or more functions of the mobile device 200. In one example, a bifurcated switch can have a top switch that activates a first function of the mobile device 200 and a bottom switch that activates a second function of the mobile device 200. In practice, the trigger switch 208 can use any suitable switch.

In some embodiments, a processor in mobile device 200 may adjust one or more operating parameters in response to receiving user input via a rotary switch 210. In some embodiments, rotary switch 210 may be used for controlling an audio function of the mobile device 200. For example, the rotary switch 210 can control a volume level of a speaker 212 or a gain level of a microphone 214 of the mobile device 200. In some embodiments, the rotary switch 210 controls a volume level of a headset coupled to the mobile device 200 through an audio jack 216 or a Bluetooth connection. In some embodiments, a user may adjust a brightness of display 204 using rotary switch 210, for example. In some embodiments, mobile device 200 may include numerous rotary switches similar to rotary switch 210 to fine tune the FoV angle and/or direction for the data acquisition device.

The mobile device 200 can also include a proximity sensor 218. The proximity sensor 218 can detect when an object is positioned proximate to the mobile device 200. A processor of the mobile device 200 can activate a data-acquisition device 220 in response to the detection of the object by the proximity sensor 218. In some embodiments, the processor in mobile device 200 can adjust the detection range of the proximity sensor 218 depending on the determined housing-support type.

Mobile device 200 may include a sensor module including sensor configured to detect housing-support elements in a housing support. In some embodiments the sensor module in mobile device 200 may include a motion sensor 222. In some embodiments, motion sensor 222 is disposed in the housing 202. In some embodiments, the motion sensor 222 activates the data-acquisition device 220 upon sensing an impact to the housing 202. The motion sensor 222 can also determine when the mobile device 200 is in a stationary or moving state. For example, the motion sensor 222 can activate the data-acquisition device 220 upon sensing that the mobile device 200 is in a stationary state for a predetermined time period. This can reduce performance degradation due to blur when the data-acquisition device 220 is an imaging device, for example. In some embodiments, a processor in mobile device 200 may adjust one or more operating parameters in response to receiving an indication from motion sensor 222. As mentioned above, touchscreen functionality of display 204 (and in some instances the display output) may be disabled if motion sensor 222 detects motion while mobile device 200 is positioned in a forklift or vehicle housing support, for example.

In some embodiments, the sensor module in mobile device 200 may include sensor 228. As shown, sensor 228 is disposed in the grip of the housing, however sensor 228 may be arbitrarily disposed anywhere in the housing. In some embodiments, the sensor 228 may be a magneto-resistive or Hall effect sensor configured to detect a magnet in a housing support. In some embodiments, the sensor 228 may be an optical sensor configured to detect that a housing support is in a close proximity to the housing of the mobile device. In some embodiments, the sensor 228 may be an RFID scanner/reader configured to determine a housing-support type based on data received via an RFID tag in a housing support.

In one embodiment, hands-free presentation mode of the mobile device 200 is activated using a video-analytic module 136 (shown in FIG. 1) that activates the data-acquisition device 220 upon recognizing an image related to an object that is captured by a camera 224 in the sensor module of the mobile device 200. In the embodiment shown, the camera 224 is a component that is separate from the data-acquisition device 220. Alternatively, the camera 224 can be integrated with the data-acquisition device 220.

In some embodiments, the mobile device 200 can be fabricated by forming the housing 202 having the handle portion 206 from a single piece of material. Alternatively, the housing 202 can be formed from several pieces of material, such as a front section and a back section. The display 204 is coupled to the housing 202 such that it is viewable by a user of the mobile device 200 when the handle portion 206 is held in the hand of the user.

The data-acquisition device 220, such as an imaging device, can be coupled to the housing 202. The imaging device can capture images upon activation of the trigger switch 208. Alternatively, the data-acquisition device 220 can be a laser scanning device and/or an RFID scanner.

Figure 3:
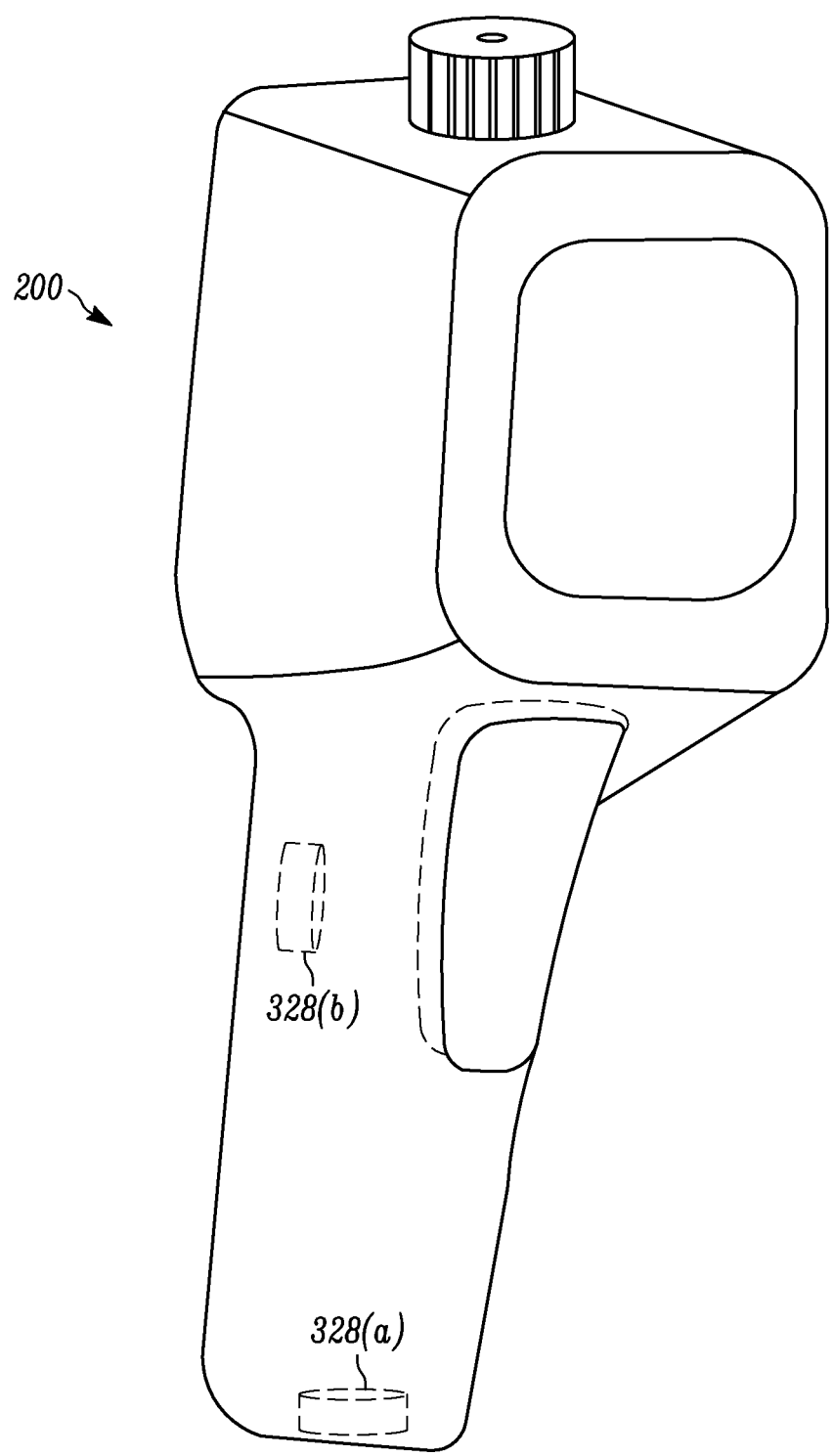
FIG. 3 depicts a sensor module array in a mobile device, in accordance with some embodiments.

FIG. 3 depicts a mobile device 200, in accordance with at least one embodiment. As shown, the sensor module of mobile device 200 includes sensors 328(a) and 328(b). Sensors 328(a) and 328(b) may take a similar form of sensor 228 in FIG. 2. As will be apparent to one of skill in the art, at least 3 various housing-support types can be detected by the array of two sensors 328(a) and 328(b); one of the sensors 328(a) or 328(b) detects a housing-support element (magnet, NFC chip, RFID tag, barcode, visual marker etc.), or both sensors detect housing-support elements, which may be used in conjunction when determining housing support type, or when identifying unique housing support types, as described below. Using mode-identification signals provided by the sensor module, a processor in mobile device 200 may be configured to determine (a) that the mobile device 200 is positioned in a housing support and (b) the type of housing support, and to adjust one or more operating parameters. It is not necessary that sensors 328(a) and 328(b) take the same form. In some embodiments, sensors 328(a) and 328(b) may be different types of sensors. In some embodiments, sensors 328(a) and 328(b) are the same type of sensor. It will be apparent to one of skill in the art that the sensor module of mobile device 200 may include any number of sensors and sensor array configurations in order to fully detect various housing-support types, and that the two sensor array shown in FIG. 3 is in no way limiting.

FIG. 4 depicts the mobile device 200 positioned inside a housing support 400, such as a holster. As shown, housing support 400 includes housing support elements 428(a) and 428(b). In some embodiments, a housing-support elements can be a magnet, an RFID tag associated with a frequency, an NFC chip, or some other element used to determine that a mobile device is positioned in the housing support and/or detect a housing-support type. The embodiment shown in FIG. 4 depicts that each sensor 328(a) and 328(b) may detect a respective housing-support element 428(a) and 428(b). A processor in mobile device 200 may use mode-identification signals (which may be raw sensor data in some embodiments) provided by sensors 328(a) and 328(b) to the processor 100 in order to determine the housing-support type, and to adjust one or more operating parameters accordingly. Other housing supports may have housing-support elements in only one position (a or b), and the processor in mobile device 200 may either determine the housing-support type based on a mode-identification signal received from a single sensor, or receive another mode-identification signal from another sensor as shown in FIG. 2 (for example, camera 224). As will be apparent to those of skill in the art, any number of sensors and housing support elements is possible and the locations of the sensors and corresponding housing-support elements are exemplary as other array configurations may be used. In an embodiment, sensor 328(a) may be a magneto-resistive or Hall effect sensor configured to detect a magnet 428(a) indicating the housing is positioned in the housing support, while sensor 328(b) may be an RFID scanner configured to detect an RFID tag 428(b) indicating what type of housing support the housing is positioned in. In yet another embodiment, different housing support types may have corresponding housing support elements 428(a), 428(b) located in various locations, which in turn trigger corresponding sensors in the mobile device. In such an embodiment, the housing support type may be determined based on which sensor(s) and/or sensor locations in the mobile device are being triggered when the device is inserted into a housing support.

In some embodiments, the sensor module may be configured to detect a unique housing support. In such embodiments, sensor 328(a) may detect an RFID tag 428(a), and the processor determines that the mobile device 200 is in a cart, and adjusts the operating parameters according to a default cart setup. However, in one scenario, the cart in which mobile device 200 is placed may be a unique cart associated with specific operating parameters pertaining to a specific use. In such an embodiment, sensor 328(b) may detect a housing support element 428(b) identifying the unique cart, and the processor may make further adjustments to a subset of the operating parameters, i.e. overwriting some of the operating parameters associated with the default cart setup. In some embodiments, the processor may configure one or more of the operating parameters to become fixed operating parameters while mobile device 200 is in the unique cart. In some embodiments, most of the operating parameters will remain the same according to the housing support type, but a select few pre-configurable operating parameters may be adjusted according to a unique housing support. It should be noted that "unique" refers to a housing support type that may have specific operating parameters associated with it, regardless of any preconfigured operating parameters associated with a default setup. In some embodiments, a user may preconfigure one or more operating parameters for a unique housing support. Embodiments should not be limited to just a cart, as any other type of housing support may be unique as well.

Figure 5:
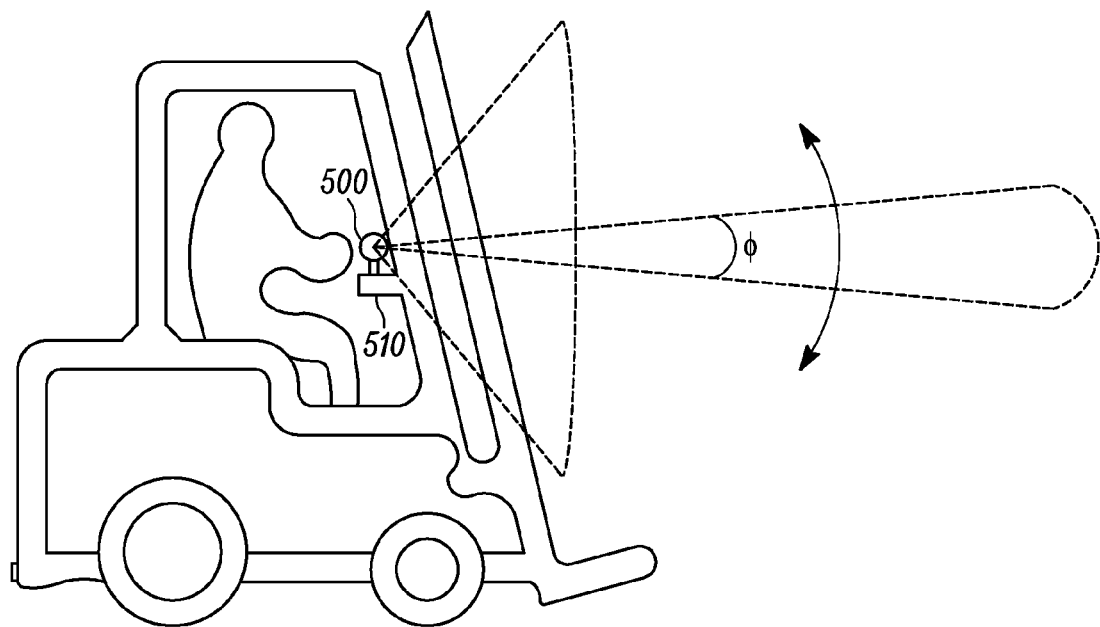
FIG. 5 depicts a forklift housing support, in accordance with some embodiments.

FIG. 5 depicts a mobile device 200 positioned in a forklift housing support 510. Forklift housing support 510 may have similar components as housing support 400. In at least one embodiment, forklift housing support 510 includes a housing support element that is detected by a sensor module in mobile device 200. The processor in mobile device 200 receives a mode-identification signal from the sensor module, and determines that mobile device 200 is placed in a housing support, and that the housing support is a forklift housing support. The processor may be configured to adjust one or more operating parameters of the mobile device 200 based on the above determinations. For example, the processor may automatically adjust a detection range of a proximity sensor of the mobile device 200 based on determining that the mobile device 200 is placed in a forklift housing support. For instance, upon detection that the mobile device is placed in a forklift housing support, the processor may switch the proximity sensor to a predetermined detection range (e.g., a long-range detection). Further, the processor may adjust the shape of the FoV of the data-acquisition device, such as the direction (see FIG. 7) and angle of the FoV (denoted in FIG. 5) in order to detect and scan objects at a predetermined distance away from the forklift, such as objects on a shelf. In an exemplary embodiment, there may be numerous boxes on a shelf at a relatively large distance away, and a narrower scanning FoV shape may allow the scanner to have a fine-tunable aim (e.g., similar to the cart example shown in FIG. 7) to scan a desired box on the shelf, and to avoid scanning other nearby boxes by mistake. Alternatively, if a forklift is holding a pallet with a large box directly in front of the scanner, the scanner FoV angle may be adjusted to be very wide so that it can detect a barcode in an arbitrary location on the box that is in close proximity. In yet further embodiments, a default proximity FoV (or detection range) activated for the forklift housing support may be pre-set by a user and may also be user adjustable after activation. For example, a user may select a short range detection in order to detect nearby objects. If the proximity sensor detects a nearby object, it may cause the processor to activate the data-acquisition device. In some embodiments, the data-acquisition device may be configured to detect a barcode, a visual marker, or other notifications of a valid data marker. In some embodiments, if the proximity sensor senses an object in front of the user but the data acquisition device does not detect a valid data marker, then the processor may be configured to provide a collision-alert warning, which may include a visual or audible warning or alert to the driver of the forklift that the driver is about to collide with the detected object, as an added safety mechanism that may be used in various modes of operation, such as forklift, cart, or vehicle modes.

In some embodiments, at least one operating parameter is dynamically adjustable for the user. For example, the user may dynamically adjust brightness of the display, volume of the loudspeaker, or various other operating parameters as discussed above, via a user input during operation, e.g., using rotary switch 210, push buttons, a touch screen, keyboard, or other components to receive user input as known to those of skill in the art. In some embodiments, a user may preconfigure at least one dynamically adjustable operating parameter for a given housing-support type. For example, the user may preconfigure the default detection range of a proximity sensor, the brightness of the display, or various other operating parameters mentioned above to be activated in connection with corresponding housing support types.

In some embodiments, at least one operating parameter is fixed for a given housing-support type. For example, if mobile device 200 is placed in a forklift housing support, the processor may be configured to disable the touchscreen functionality of the display and the display output as a safety precaution for the driver. Fixed operating parameters may not be dynamically adjusted or preconfigured by the user. FIG. 5 and its description relate to a forklift operation, but the more broadening term "vehicle mode" can also be used in describing any vehicle that the mobile device 200 may be mounted to, including but not limited to forklifts, burden carriers, personnel carriers, recreational carriers, specialty vehicles, stock chaser vehicles, and tug vehicles.

Figure 6:
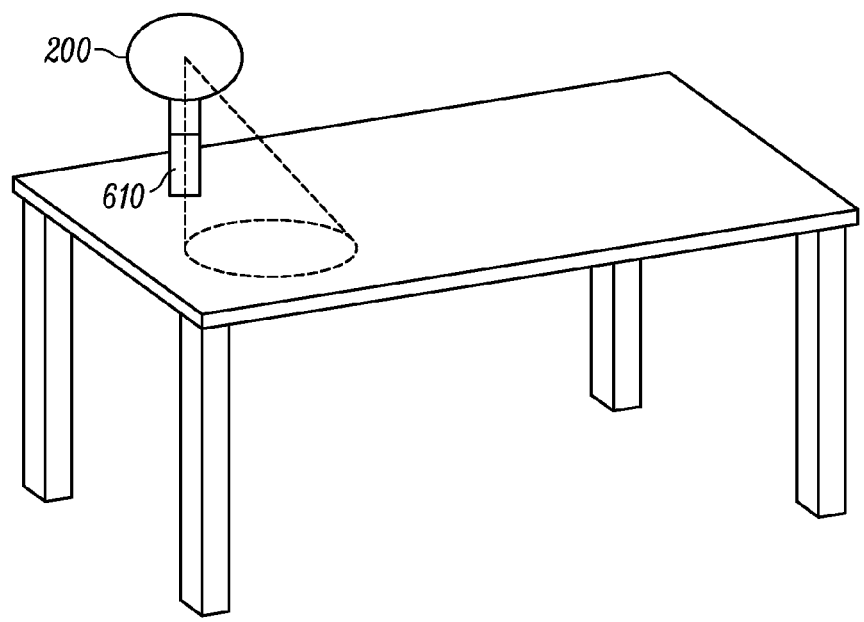
FIG. 6 depicts a desk housing support, in accordance with some embodiments.

FIG. 6 depicts mobile device 200 in a desk housing support 610. Desk housing support 610 may include similar components as the forklift housing support 510, however, the sensor module in mobile device 200 is configured to detect a distinction between the two housing supports. The processor in mobile device 200 may receive a mode-identification signal indicative that the mobile device 200 is in a desk housing support, and the processor may responsively adjust one or more operating parameters. Similar to the forklift housing support 510, desk housing support 610 may have a set of corresponding preconfigured operating parameter settings. Also, desk housing support 610 may have at least one dynamically adjustable operating parameter. In some embodiments, desk housing support 610 may have at least one fixed operating parameter. As shown, if mobile device 200 detects it is placed in a desk housing support 610, then the processor may be configured to put the mobile device 200 into desk operating mode. As shown, the mobile device 200 may have a default close range proximity sensor setting, with a pre-configurable or dynamically adjustable broad or narrow FoV for the data acquisition device, depending on user preference. In some embodiments, a pre-configurable operating parameter may be enabling/disabling a voice command feature. In a first embodiment, the voice command feature may be enabled while mobile device 200 is in desk mode. A user may command the mobile device 200 to activate the data acquisition device by saying "scan," or some other indication phrase, and then mobile device 200 might deactivate the data acquisition device after a predetermined time of not receiving any voice commands. Alternatively, in noisier environments, the mobile device 200 may be preconfigured to disable voice commands while in desk mode. For instance, if numerous users each using a mobile device were in the same environment, mobile device 200 may not know exactly what user is issuing the voice commands, thus in such a scenario a short-range proximity sensor alone may be sufficient in activating the data acquisition unit.

Figure 7:
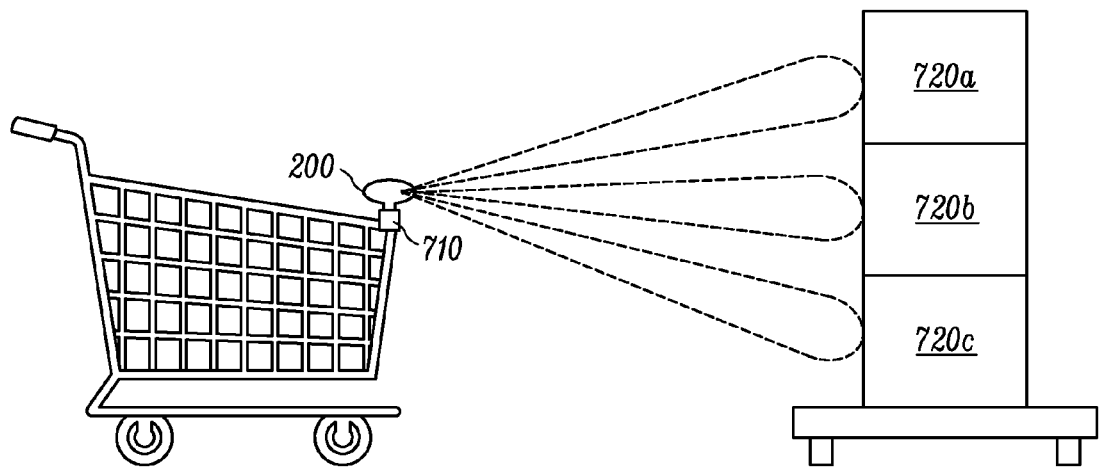
FIG. 7 depicts a cart housing support, in accordance with some embodiments.

FIG. 7 depicts mobile device 200 positioned in a cart housing support 710. Similar to the forklift and desk housing supports described above, mobile device 200 receives a mode-identification signal from the sensor module indicative of detection of at least one housing-support element in cart housing support 710. The processor may then determine (a) position in a housing support and (b) the type of housing support, and responsively adjust one or more operating parameters based on the type of housing support. As was the case with the forklift and desk housing supports, the cart housing support 710 may include any combination of pre-configured operating parameters, dynamically adjustable operating parameters, and fixed operating parameters. Three fields of view are shown that may be preconfigured and possibly dynamically adjusted via user input, however the three fields of view are just for illustrative purposes, and are in no way limiting. As shown, the 3 fields of view are able to detect three different objects (shown as boxes 720(a), 720(b), and 720(c)), which may be stacked on a shelf. A default field of view may be preconfigured by the user to scan box 720(b), and then in some embodiments the user may be able to dynamically adjust the field of view up or down to scan boxes 720(a) or 720(c). In some embodiments, camera 224 may be used in conjunction with data acquisition device 220. For instance, the camera may be initialized to capture the area seen by the scanner according to the current FoV, and to display the captured area on display 204 as a video feed, and then the user can dynamically adjust the FoV up, down, left, right, as well as the angle ϕ of the FoV (i.e., broadness or width) using rotary switches (e.g., the rotary switch illustrated by 210) to capture the desired barcode, etc. by using display 204 as a guide. In some embodiments, the user may adjust the direction and zoom of the camera to capture a visual marker while using display 204 as a guide, and a processor may recognize the visual marker resulting in a successful scan.

Figure 9:
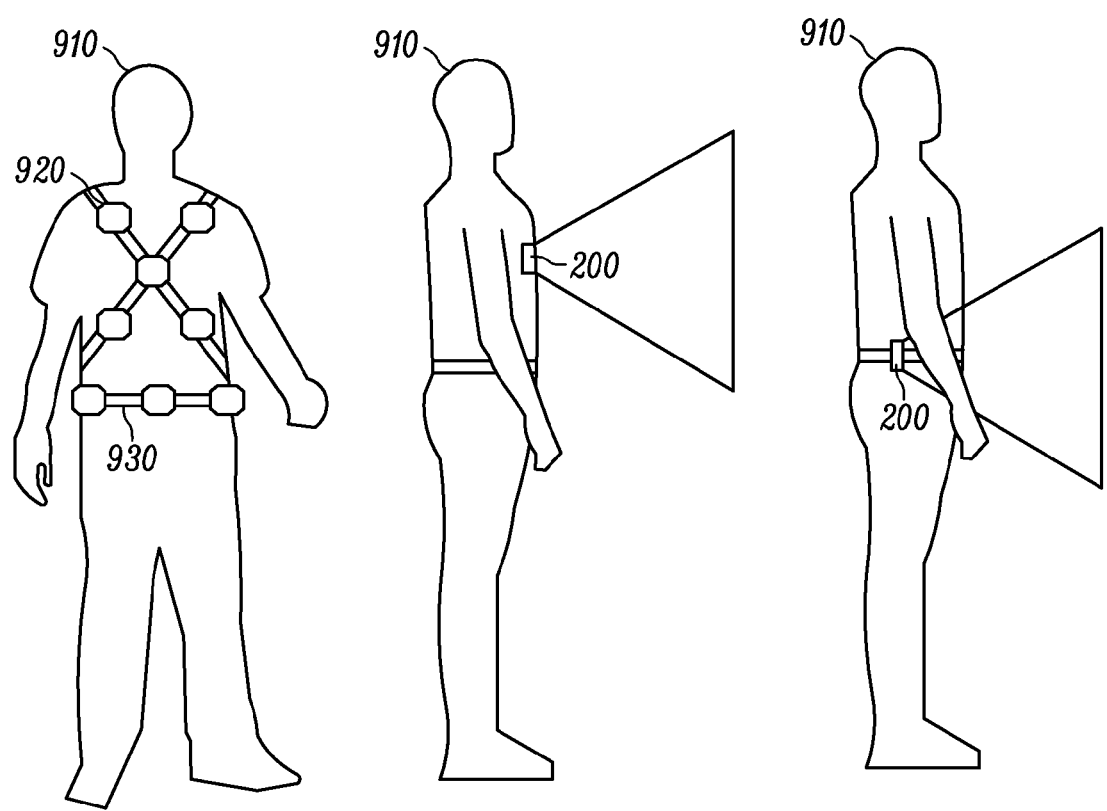
FIG. 9 depicts torso and waist housing supports, in accordance with some embodiments.

FIG. 9 depicts mobile device 200 positioned in a torso housing support 920 and a waist housing support 930 worn by user 910. The sensor module disposed in mobile device 200 may detect a housing-support element in torso housing support 920, and the processor may identify the housing support type. In some embodiments, the processor may be configured to enable short range proximity for the proximity sensor, and adjust the angle/direction of the FoV of the data acquisition device. Similar to the desk mount, voice commands may be preconfigured or dynamically enabled/disabled based on application. Further, user 910 may have an assigned torso housing support 920 with a unique NFC chip, for example, and may cause the processor to configure mobile device 200 with a unique set of parameters. This unique set of operating parameters may be different than operating parameters associated with another user's torso housing support, even though both are torso housing supports. Thus in some embodiments, the processor in mobile device 200 may adjust one or more operating parameters differently according to various users' torso housing supports. As mentioned above, this could be implemented using multiple sensors (328(*a*) and 328(*b*) as shown in FIG. 3) in the sensor module. Such embodiments are not limited to only torso housing supports, and may be used in various unique waist housing supports, cart housing supports, forklift housing supports, desk housing supports, and any other housing support type.

Table 1 illustrates a chart showing possible operating parameter configurations for various types of housing-support types. In some embodiments, one or more operating parameters may be preconfigured by a user as default settings prior to placing the mobile device in a housing support. In some embodiments, one or more operating parameters may be dynamically configured while the mobile device is in the housing support.

TABLE 1

Example Operating Parameter Pre-Configurations

| Feature | Housing-Support Type | | | | | |
|---|---|---|---|---|---|---|
| | Torso | Waist | Desk | Cart | Fork-lift | Vehicle Mode |
| Enable Short-Range Proximity-Detection | ✓ | ✓ | ✓ | | | |
| Enable Long-Range Proximity-Detection | | | | ✓ | ✓ | ✓ |
| Disable Touch Screen | | | | ✓ | ✓ | ✓ |
| Disable Display Output | ✓ | ✓ | | | | |
| Present Navigation UI | | | | ✓ | ✓ | ✓ |
| Adjust Display Brightness | | | ✓ | ✓ | ✓ | ✓ |
| Enable Voice Commands | ✓ | ✓ | ✓ | ✓ | ✓ | ✓ |
| Adjust Field of View of the Data-Acquisition Device (e.g., shape/direction) | ✓ | ✓ | ✓ | ✓ | ✓ | ✓ |
| Initiate Specific Application | ✓ | ✓ | ✓ | ✓ | ✓ | ✓ |

In some embodiments, after the processor has determined the mobile device has been placed in a torso or in a waist housing support, the processor may enable short range proximity detection, disable the display output, enable voice commands, adjust the shape of the FoV for the data acquisition device, and initiate a specific application.

In some embodiments, after the processor has determined the mobile device has been placed in a desk housing support, the processor may enable short range proximity detection, adjust the brightness of the display, enable voice commands, adjust the shape of the FoV for the data acquisition device, and initiate a specific application.

In some embodiments, after the processor has determined that the mobile device has been placed in either a cart, forklift, or vehicle housing support, the processor may enable long range proximity detection, disable touchscreen functionality, present a navigation UI, adjust the brightness of the display, enable voice commands, adjust the shape of the FoV for the data acquisition device, and initiate a specific application. In some embodiments, one or more of the parameters may by preconfigured before the mobile device is placed in the housing support, or may be dynamically adjusted during operation. In some embodiments one or more operating parameters may be fixed for the desk mode of operation.

It should be noted that Table 1 does not encompass a complete list of operating parameters, and is in no way limiting. Some operating parameters in Table 1 may be preconfigured operating parameters, while other operating parameters may be more dynamically adjustable during use may include screen brightness, speaker volume, and any other operating parameters that may be adjusted based on user preference during operation. In some embodiments, an operating parameter preconfigured prior to use may be dynamically adjusted after the mobile device has already adjusted the preconfigured operating parameters subsequent to being placed in a housing support In some embodiments, the mobile device may initiate a specific application in response to being placed in a housing support. For example, in a body worn support (torso or waist), the mobile device may initiate a normal scanning application. Then, if the mobile device is placed in a forklift holster, the mobile device may initiate a navigation application. For instance, after scanning an object and then placing the mobile device into a forklift support, the mobile device may initiate the navigation system indicating where the user needs to take the scanned object in a warehouse. Various other applications may be preconfigured to activate in response to the mobile device being placed in a certain housing-support type. Some applications may be preconfigured to initiate for various support types, while other applications may be exclusive to a single support type.

In some embodiments, applications may be configured to initiate in response to actions performed by the mobile device while in a given holster. For instance, putting the mobile device in a forklift holster may initiate an application directing the user to get an object off a shelf. In response to scanning and getting the object, an application may then initiate to instruct the user to put on a cart/conveyer belt/go down to be packed, and provide navigation to complete the task.

In some embodiments, a warehouse management system (WMS) system may assist in initiating applications on the mobile device, by initiating applications by sending commands from a remote server based on the housing-support type.

Figure 8:
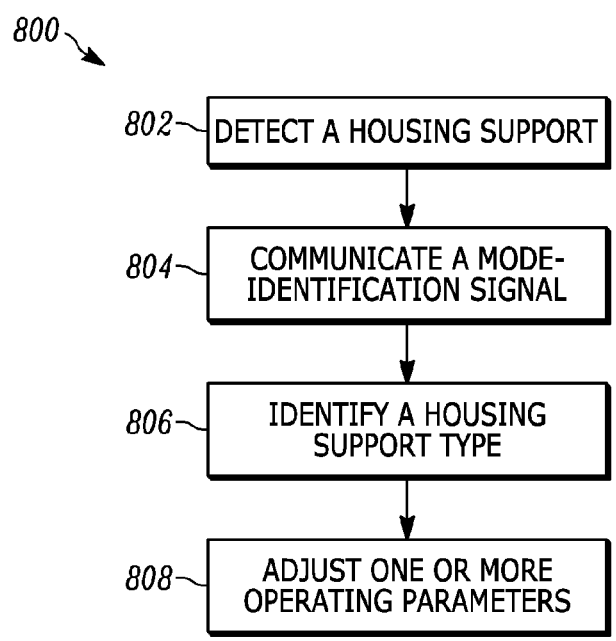
FIG. 8 depicts a flowchart of a method, in accordance with some embodiments.

FIG. 8 depicts a flowchart of a method 800, in accordance with some embodiments. A housing-support element is detected via a sensor module at step 802, a mode-identification signal is communicated to a processor at step 804, the processor determines a housing-support type at step 806, and the processor adjusts one or more operating parameters at step 808 based at least in part on the determined housing-support type. In some embodiments, at least one operating parameter is selected from the group consisting of: enabling short-range proximity detection, enabling long-range proximity detection, disabling or enabling a touch screen and/or display output, presenting a navigation user interface (UI), disabling or enabling voice commands, adjusting display brightness, adjusting speaker loudness, and adjusting a field of view for the data acquisition unit (e.g., scanning distance, shape, or direction), imager, and/or a proximity sensor.

In some embodiments, the housing-support type is a waist housing support. In some embodiments, the housing-support type is a desk housing support. In some embodiments, the housing-support type is a cart housing support. In some embodiments, the housing-support type is a forklift housing support.

In some embodiments, the sensor module comprises at least one device selected from the group consisting of: a magnet, an RFID scanner, an NFC chip, a rotary switch, a potentiometer, a microphone, an optical sensor, an imager, a magnetometer, a gyroscope, and an accelerometer.

In some embodiments, the method 800 further comprises acquiring data using a data-acquisition device. In some embodiments, the data-acquisition device is a device selected from the group consisting of a laser scanner, a Lidar, an RFID scanner, and a camera.

In some embodiments, the sensor module comprises a plurality of magneto-resistive sensors, wherein a subset of the magneto-resistive sensors is configured to detect at least one magnet in the housing support.

In some embodiments, the sensor module comprises multiple sensors, each of the multiple sensors configured to detect a respective housing-support element in the housing support.

In some embodiments, the sensor module comprises a magneto-resistive sensor configured to detect a magnet in the housing support. In some embodiments, the sensor module comprises an optical sensor configured to detect that the housing support is in a close proximity to the housing of the mobile device. In some embodiments, the sensor module comprises an RFID scanner configured to determine a housing-support type based on data received via an RFID tag in the housing support. In some embodiments, the sensor module comprises a scanner configured to scan a barcode on the housing support. In some embodiments, the sensor module comprises a camera configured to identify a visual marker on the housing support. In some embodiments, the visual marker is a barcode. In some embodiments, the visual marker is an image. In some embodiments, the visual marker is a QR-code.

In some embodiments, the method 800 further comprises dynamically adjusting at least one operating parameter in response to a user request via a user interface (UI).

In some embodiments, at least one operating parameter is pre-configured by a user for the housing-support type.

In some embodiments, at least one operating parameter is fixed for the housing-support type.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included in the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover, in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes" . . . a "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A mobile device comprising:
   a housing;
   a data-acquisition device disposed in the housing;
   a sensor module configured to detect at least one housing-support element in a housing support, and to communicate a mode-identification signal indicative of the detection; and
   a processor coupled to the sensor module, configured to receive the mode-identification signal, to determine (a) whether the housing is positioned in a housing support and (b) a housing-support type, and to adjust one or more operating parameters of the mobile device based at least in part on the determined housing-support type,
   wherein the sensor module comprises multiple sensors, each of the multiple sensors configured to detect the at least one housing-support element.

2. The mobile device of claim 1, wherein at least one of the operating parameters is selected from the group consisting of enabling short-range proximity detection, enabling long-range proximity-detection, disabling a touch screen, presenting a driving-mode user interface (UI), enabling voice commands, display brightness, speaker loudness, and a field of view of the data-acquisition device and/or a proximity sensor.

3. The mobile device of claim 1, wherein the housing-support type is selected from the group consisting of a torso housing support, a waist housing support, a desk housing support, a cart housing support, a forklift housing support, and a vehicle housing support.

4. The mobile device of claim 1, wherein the sensor module comprises at least one device selected from the group consisting of a magneto-resistive sensor, a Hall-effect sensor, a radio-frequency identification (RFID) reader, a near-field communication (NFC) scanner, a microphone, an optical sensor, an imager, a gyroscope, and an accelerometer.

5. The mobile device of claim 1, wherein the data-acquisition device comprises at least one device selected from the group consisting of a scanner, a radio-frequency identification (RFID) reader, and a camera.

6. The mobile device of claim 1, wherein the sensor module comprises a plurality of magneto-resistive sensors, the at least one housing-support element comprises at least one magnet, and a subset of the magneto-resistive sensors is configured to detect the at least one magnet.

7. The mobile device of claim 1, wherein the sensor module comprises a magneto-resistive sensor configured to detect a magnet in the housing support.

8. The mobile device of claim 1, wherein the sensor module comprises an optical sensor configured to detect that the housing support is in a close proximity to the housing.

9. The mobile device of claim 1, wherein the sensor module comprises a radio-frequency identification (RFID) reader configured to receive data from an RFID tag associated with the housing support; and
   wherein the processor determines a housing-support type based on the data received from the RFID tag.

10. The mobile device of claim 1, wherein the sensor module comprises a microphone configured to detect a sound associated with the housing support, the sound being a unique sound in a library of unique sounds.

11. The mobile device of claim 1, further comprising an imager configured to identify a visual marker on the housing support.

12. The mobile device of claim 1, wherein the processor is further configured to adjust one or more operating parameters based on user input subsequent to adjusting the one or more operating parameters based on the housing-support type.

13. The mobile device of claim 1, wherein at least one of the operating parameters is pre-configured by a user for the housing-support type.

14. The mobile device of claim 1, wherein at least one of the operating parameters is fixed for the housing-support type.

15. A mobile device comprising:
   a housing;
   a data-acquisition device disposed in the housing;
   a proximity sensor disposed in the housing and configured to detect a presence of an object, and to communicate a detection signal to activate the data-acquisition device;
   a sensor module configured to detect a housing-support element in a housing support, and to communicate a mode-identification signal indicative of the detection; and
   a processor coupled to the sensor, configured to receive the mode-identification signal from the sensor module and determine (a) whether the housing is positioned in the housing support and (b) a housing-support type, and to adjust one or more operating parameters of the mobile device based at least in part on the determined housing-support type, wherein adjusting the one or more operating parameters comprises setting a detection range of the proximity sensor.

16. A method comprising:
   detecting, via a sensor module, a housing-support element in a housing support;
   communicating a mode-identification signal indicative of the detection to a processor;
   identifying, via the processor, a housing-support type of the housing support in response to receiving the mode-identification signal; and
   adjusting, via the processor, one or more operating parameters based at least in part on the determined housing-support type.

17. The method of claim 16, wherein the sensor module comprises a magneto-resistive sensor, and wherein detecting the housing-support element comprises detecting a magnet in the housing support using the magneto-resistive sensor.

18. The method of claim 16, wherein the sensor module comprises an optical sensor, and wherein detecting the housing-support element comprises detecting that the housing support is in a close proximity to the housing.

19. The method of claim 16, wherein the sensor module comprises a radio-frequency identification (RFID) reader, and wherein detecting the housing-support element comprises receiving data from an RFID tag associated with the housing support; and wherein the processor determines a housing-support type based on the data received from the RFID tag.

20. The method of claim 16, wherein the sensor module comprises a scanner configured to scan a barcode on the housing support.

21. The method of claim 16, wherein the sensor module comprises an imager configured to identify a visual marker on the housing support.

22. The method of claim 21, wherein the visual marker is selected from the group consisting of a barcode and a Quick Response (QR) code.

23. The method of claim 16, wherein the sensor module comprises multiple sensors, each of the multiple sensors configured to detect at least one housing-support element.

* * * * *